(12) United States Patent
Yamada et al.

(10) Patent No.: US 7,458,632 B2
(45) Date of Patent: Dec. 2, 2008

(54) VEHICLE BODY STRUCTURE

(75) Inventors: Takayuki Yamada, Saitama (JP); Kazuhiko Maruyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/977,265

(22) Filed: Oct. 24, 2007

(65) Prior Publication Data

US 2008/0111397 A1  May 15, 2008

(30) Foreign Application Priority Data

Nov. 10, 2006  (JP) ............................ P2006-305807

(51) Int. Cl.
B62D 25/20 (2006.01)

(52) U.S. Cl. ............................ 296/193.07; 296/187.08; 296/198

(58) Field of Classification Search ............ 296/187.08, 296/191, 193.02, 193.06, 193.07, 198, 29, 296/30; 180/90.6

See application file for complete search history.

(56) References Cited

U.S. PATENT DOCUMENTS

| 4,883,309 | A | * | 11/1989 | Miyazaki et al. | ....... 296/193.09 |
|---|---|---|---|---|---|
| 6,830,289 | B2 | * | 12/2004 | Miyabayashi | .......... 296/193.07 |
| 7,182,381 | B2 | * | 2/2007 | Ogawa et al. | ................. 296/29 |
| 2004/0183339 | A1 | * | 9/2004 | Seksaria et al. | ......... 296/203.02 |
| 2005/0161965 | A1 | * | 7/2005 | Eberlein | ...................... 296/29 |

FOREIGN PATENT DOCUMENTS

| DE | 198 19 446 A 1 | 11/1999 |
|---|---|---|
| EP | 1073579 | 2/2001 |
| EP | 1440870 | 7/2004 |
| JP | 2005-212601 | 8/2005 |
| JP | 2005-219589 | 8/2005 |

OTHER PUBLICATIONS

Machine Translation of European Patent Publication 1440870, Mar. 29, 2008.*

* cited by examiner

*Primary Examiner*—Jason S Morrow
(74) *Attorney, Agent, or Firm*—Carrier, Blackman & Associates, P.C.; Joseph P. Carrier; William D. Blackman

(57) ABSTRACT

A vehicle body structure includes a firewall having a board body made from an aluminum alloy. Steel left and right housing curved parts which may be readily press molded, and which constitute rear parts of left and right wheel housings, are attached to the left and right sides of the board body.

7 Claims, 11 Drawing Sheets

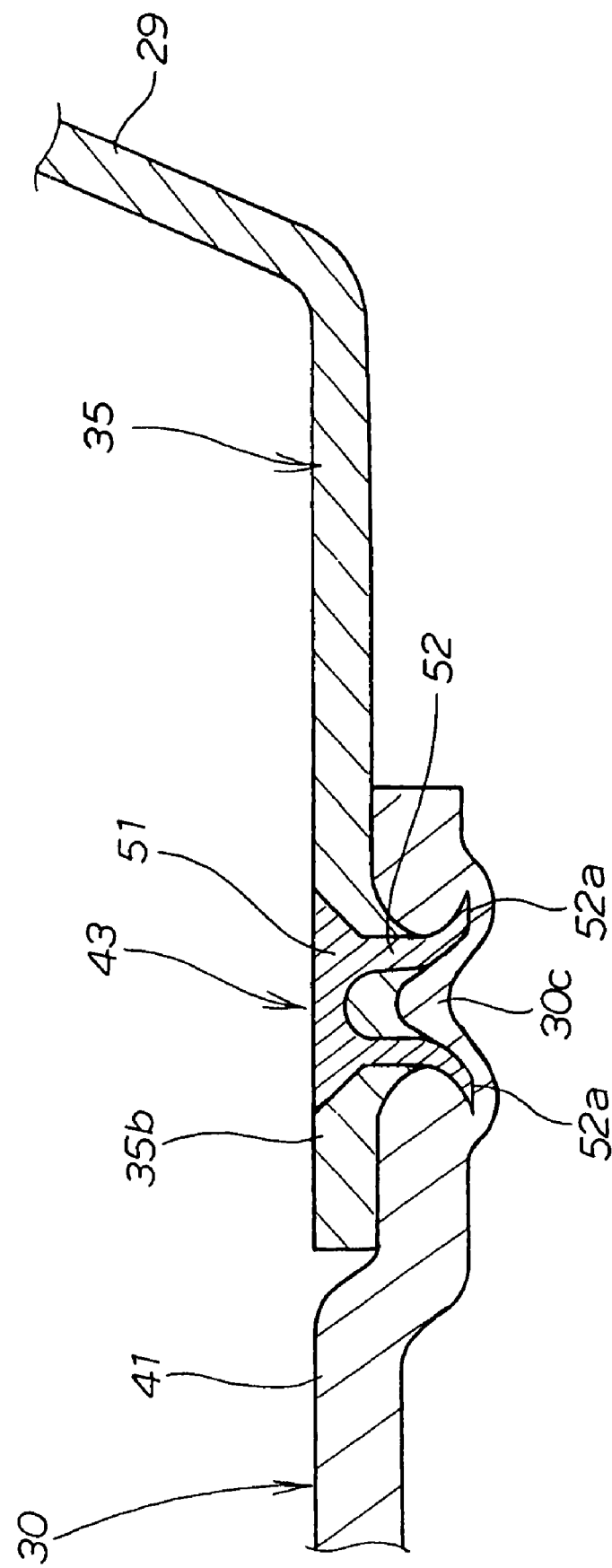

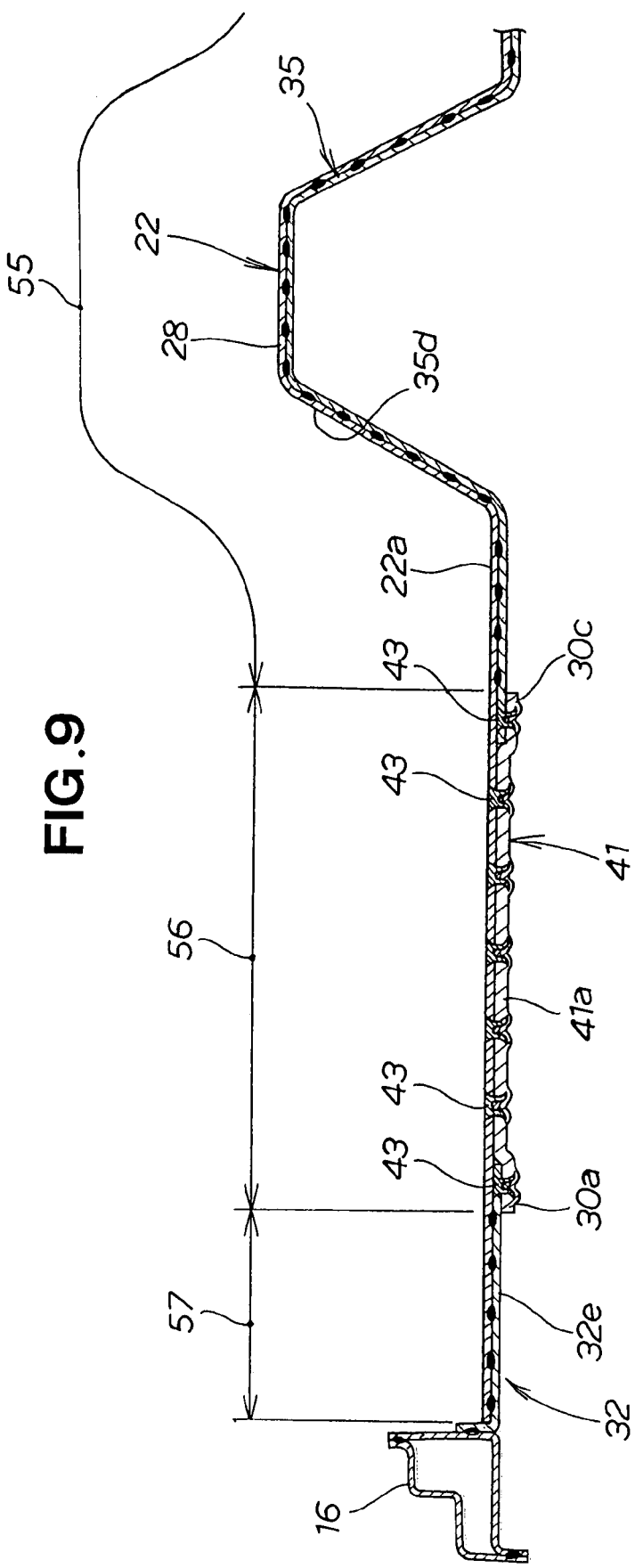

(EX A.)

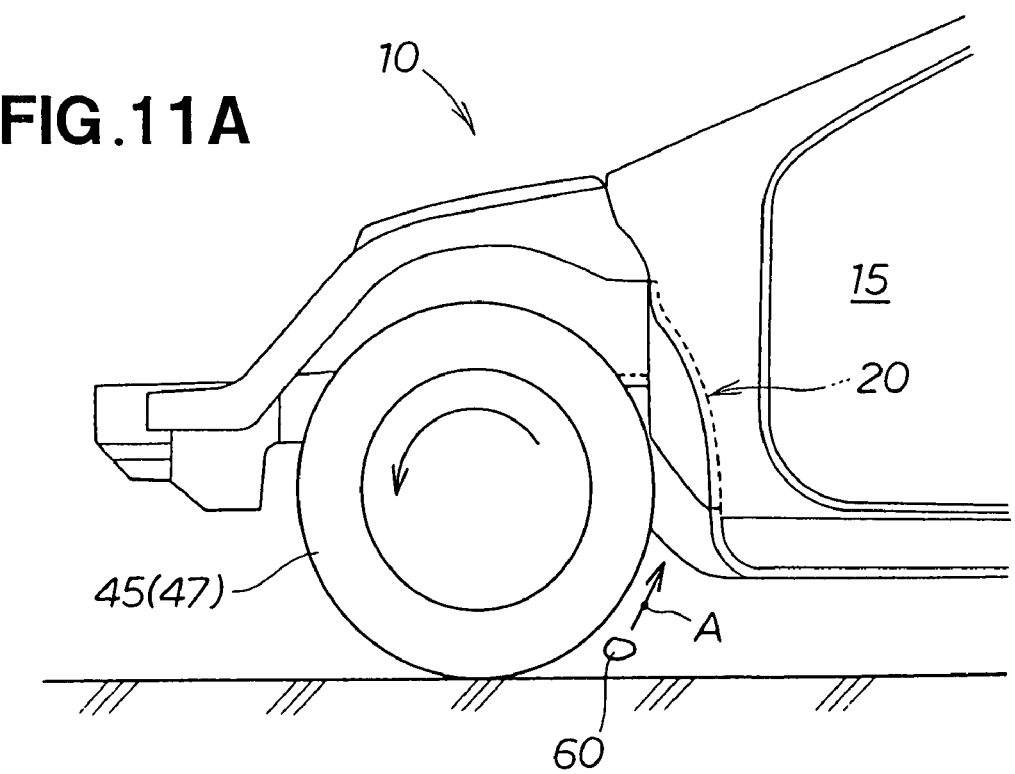
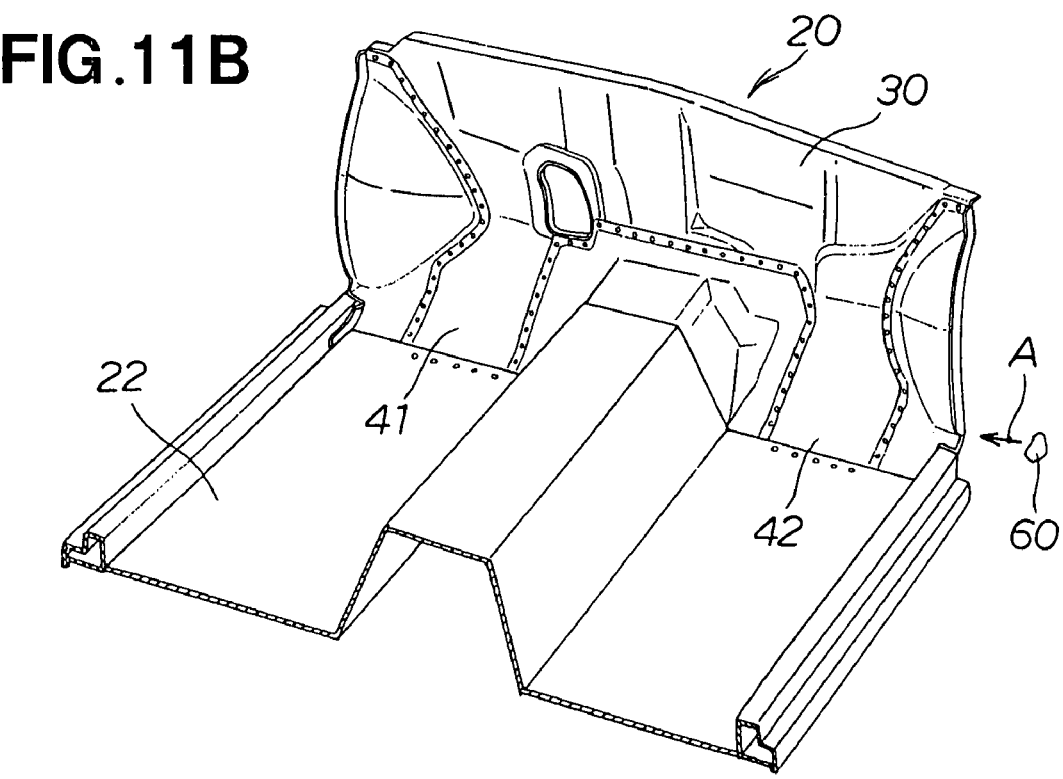

VEHICLE BODY STRUCTURE

FIELD OF THE INVENTION

The present invention relates to a vehicle body structure having a firewall or a bulkhead that divides an engine compartment and a cabin.

BACKGROUND OF THE INVENTION

Vehicle body structure conventionally known from EP 1440870 A2 includes a firewall which is formed from an aluminum alloy plate and weld-connected to the vehicle body via a steel adapter.

In the vehicle body structure, left and right adapters are riveted respectively to the left and right ends of the firewall, and a lower adapter is riveted to the lower portion of the firewall.

The left and right adapters are members that form the inner panels of left and right front pillars. The left and right adapters are joined to the outer panels of the left and right front pillars by spot welding or the like, whereby the left and right ends of the firewall are attached to the left and right front pillars.

The lower adapter is also joined to a floor panel by spot welding or the like, whereby the lower portion of the firewall is attached to the floor panel. The firewall is thereby attached to the vehicle body structure. An aluminum alloy plate is used for the firewall, whereby the weight of the vehicle can be reduced.

It is necessary to increase the plate thickness of the firewall in order to endow the aluminum alloy firewall with the same rigidity as a steel firewall. If the plate thickness of the aluminum alloy firewall is increased, the degree of freedom during forming the firewall by press molding will be reduced. Consequently, using an aluminum alloy firewall makes it difficult to mold, for example, the left and right wheel housings and other curved shape areas. It is therefore necessary to shift the aluminum alloy firewall to the rear (i.e., toward the cabin) of the vehicle body in the left and right wheel housings, making it difficult to increase the size of the cabin.

The degree of freedom in forming the aluminum alloy firewall by press molding is also reduced, and it is therefore difficult to accurately press mold the firewall. Therefore, there is a need for a development of a technique whereby an aluminum alloy firewall can be manufactured even more accurately.

SUMMARY OF THE INVENTION

It is therefore an object of the present invention to provide a vehicle body structure whereby the weight of the vehicle body can be reduced, a large cabin space can be ensured, and an aluminum alloy firewall can be manufactured even more accurately.

According to an aspect of the present invention, there is provided a vehicle body structure comprising: a firewall for dividing or separating an engine compartment and a cabin of a vehicle; and a floor panel that is provided to a lower end portion of the firewall, and that has a floor tunnel that is formed transversely centrally of the vehicle and extends longitudinally of the vehicle body. The firewall has a lightweight alloy board body for dividing or separating the engine compartment and the cabin; steel left and right housing curved parts that are provided to left and right end parts of the board parts, and that form rear parts of left and right wheel housings; and a steel tunnel part that is provided to a lower central part of the board body, and forms a front end part of the floor tunnel.

The weight of the vehicle body can thus be reduced by configuring the board body from a light alloy. The light alloy in the embodiments may, for example, be an aluminum alloy.

Since the left and right housing curved parts are made of steel, it is possible to reduce the plate thickness of the left and right housing curved parts and increase the degree of freedom in forming the left and right housing curved parts. The rear portions of the left and right wheel housings are formed by the left and right housing curved parts. The board body is provided between the left and right wheel housings and further forward than the rear ends of the left and right wheel housings, whereby a large cabin space can be ensured.

Furthermore, there is an increased degree of freedom in shaping the light alloy left and right housing curved parts by press molding, and the firewall can be more accurately manufactured.

The floor panel has a floor tunnel that is formed in the center of the width direction of the vehicle and extends in the longitudinal direction of the vehicle body, and the firewall preferably further has a steel tunnel part that is provided to the center of the lower portion of the board body, and forms a front end part of the floor tunnel.

Preferably, the board body has a passenger-side foot rest for supporting the feet of a vehicle occupant sitting in a passenger seat; and a driver-side foot rest for supporting the feet of a vehicle occupant sitting in the driver seat. The foot rests are formed so as to be thicker than the other parts of the board body. The amplitude of the vibrations in the driver-side foot rest and the passenger-side foot rest can be suppressed and ambient noise reduced when gravel thrown up by the wheels strikes the driver-side foot rest or the passenger-side foot rest or when vibration is created by the engine or the like.

Desirably, the tunnel part is attached to the board body by a fastening member, and is joined to the floor panel by welding. A fastening device for fastening rivets or another fastening member (referred to as rivet fastening device hereinafter) is disposed away from an assembly line. The rivet fastening device is therefore separated from the tunnel part, and it is difficult for the fastening member of the rivet fastening device to reach the floor panel. Therefore, the steel tunnel part is fastened to the light alloy board body using rivets or another fastening member, and the tunnel part is welded to the floor panel. Consequently, the tunnel part is attached to the board body by rivets or another fastening member in a pre-step for attaching the firewall to the vehicle body. The tunnel part is welded to the floor panel, whereby the tunnel part is readily attached to the floor panel.

Preferably, the left and right housing curved parts are attached to the board body by a fastening member, and are welded or otherwise joined to the floor panel.

The left and right housing curved parts are steel members, while the board body is a light alloy (e.g., aluminum alloy). Therefore, the left and right housing curved parts are preferably joined to the board body by fastening members. The floor panel is a steel member, and the left and right housing curved parts are therefore preferably joined to the floor panel by welding.

Consequently, it is possible to attach the left and right housing curved members to the board body using rivets or another fastening member in a pre-step for attaching the firewall to the vehicle body. The left and right housing curved parts can be thereby readily and securely attached to the board body using rivets or another fastening member via the fastening member of the rivet fastening device. The floor panel is a steel member, and the left and right housing curved parts are therefore welded to the floor panel. Therefore, the left and right housing curved parts can be readily and securely connected to the floor panel.

BRIEF DESCRIPTION OF THE DRAWINGS

Certain preferred embodiments of the present invention will be described in detail below, by way of example only, with reference to the accompanying drawings, in which:

FIG. 8 is a sectional view taken along line 8-8 of FIG. 5;

FIG. 9 is a sectional view taken along line 9-9 of FIG. 3;

FIGS. 11A and 11B are schematic views illustrating a reason for increasing the plate thickness of the passenger-side foot rest and the driver-side foot rest of the present invention.

DETAILED DESCRIPTION OF THE PREFERRED EMBODIMENTS

Figure 1:
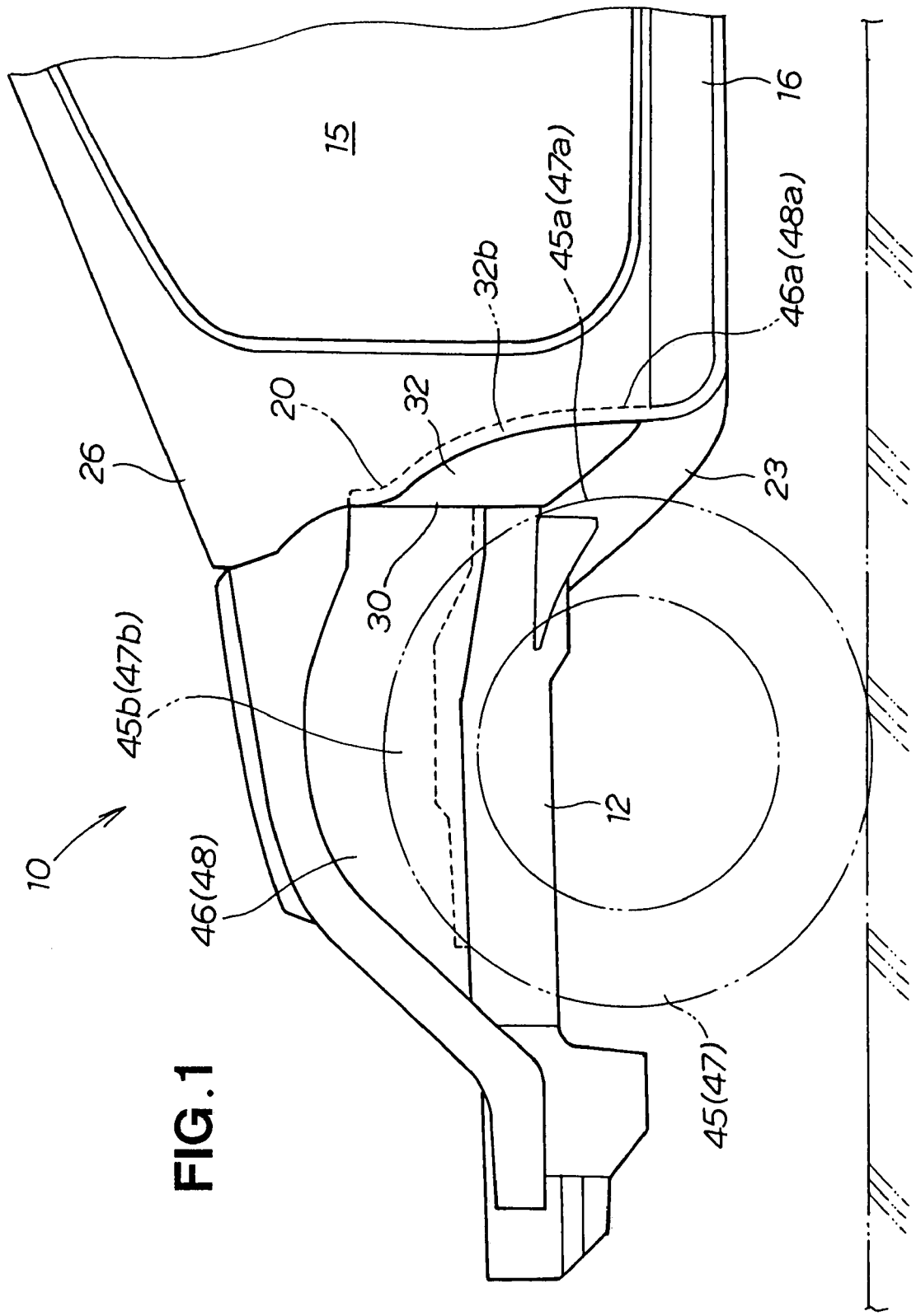
FIG. 1 is a schematic view showing a part of a vehicle having a vehicle body structure according to the present invention.
Figure 2:
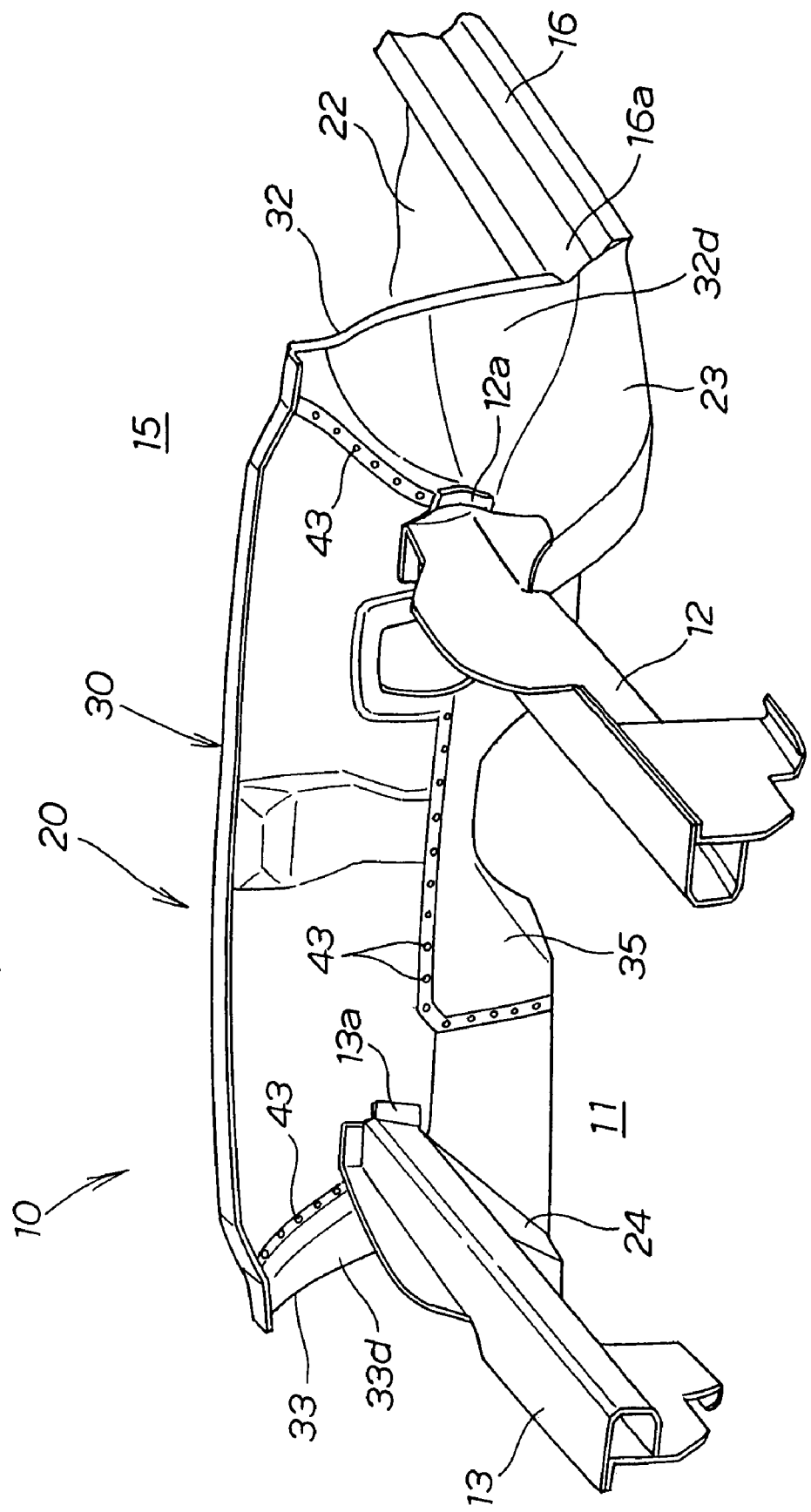
FIG. 2 is a schematic view the vehicle body structure of FIG. 1 as seen from the front.

As shown in FIGS. 1 and 2, a vehicle body structure 10 has left and right front side members 12, 13 for forming left and right frame parts of an engine compartment 11; left and right side rails 16, 17 for forming left and right frame parts of a cabin 15 (see FIG. 3 for the right side rail 17); a firewall 20 for dividing the engine compartment and the cabin 15; and a floor panel 22 connected to a lower end part 20a (see FIG. 3) of the firewall 20.

The left front side member 12 and the left side rail 16 are connected by a left outrigger 23. The right front side member 13 and the right side rail 17 are connected by a right outrigger 24.

The left front side member 12 is disposed in front of the firewall 20 and on the left side of the engine compartment 11, and extends in the longitudinal direction of the vehicle body. The right front side member 13 is disposed in front of the firewall 20 and on the right side of the engine compartment 11, and extends in the longitudinal direction of the vehicle body.

The left side rail 16 is disposed behind the firewall 20 and on the left side of the cabin 15, and extends in the longitudinal direction of the vehicle body. The right side rail 17 (see FIG. 3) is disposed behind the firewall 20 and on the right side of the cabin 15, and extends in the longitudinal direction of the vehicle body.

Figure 3:
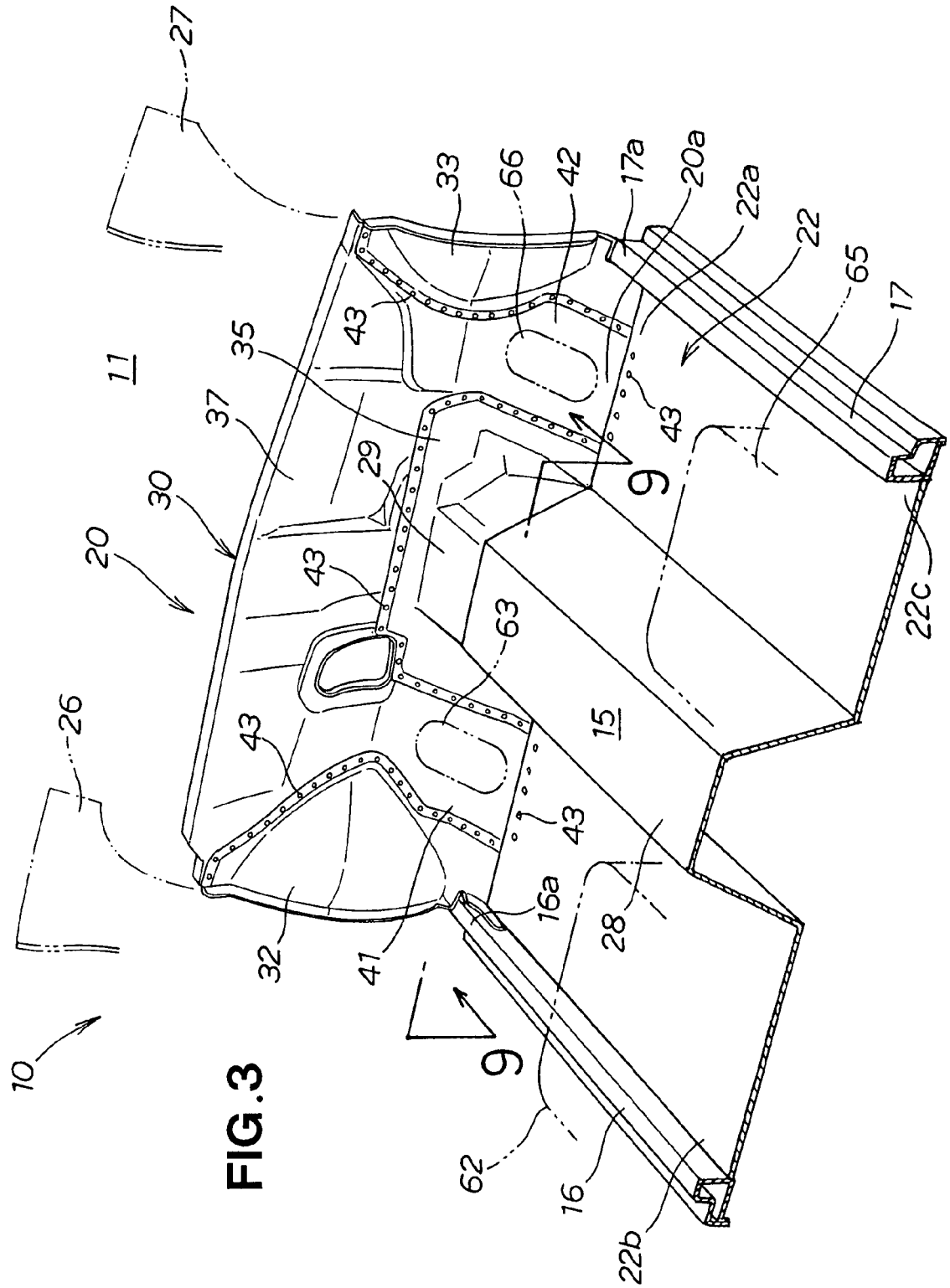
FIG. 3 is a schematic view of the vehicle body structure shown in FIG. 2 as seen from the rear.
Figure 4:
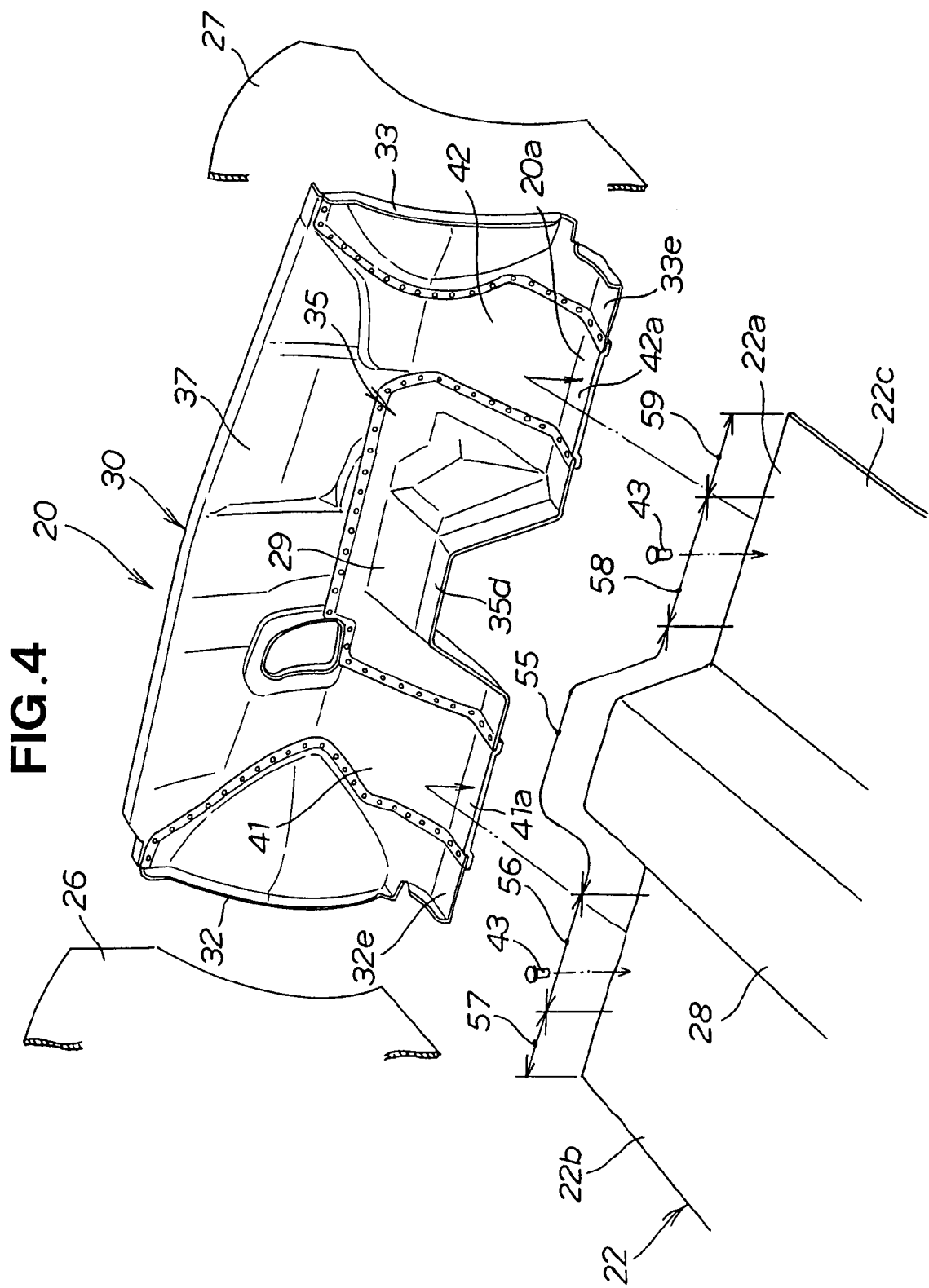
FIG. 4 is an exploded perspective view of the vehicle body structure shown in FIG. 3.

As shown in FIGS. 3 and 4, the firewall 20 is a panel-shaped member formed in a substantially rectangular shape. The firewall 20 is provided in the width direction of the vehicle, and is a wall dividing the engine compartment 11 and the cabin 15.

The left end part of the firewall 20 is spot welded to a left pillar 26. The right end part of the firewall 20 is spot welded to a right pillar 27.

A front end part 22a of the floor panel 22 is attached to the lower end part 20a of the firewall 20. A left end part 22b of the floor panel 22 is spot welded to the left side rail 16, and a right end part 22c is spot-welded to the right side rail 17. A floor tunnel 28 protrudes upwards toward the cabin 15, and is formed in the center of the floor panel 22 along the width direction so as to extend in the longitudinal direction of the vehicle body. The floor part of the cabin 15 is thereby formed by the floor panel 22

Figure 5:
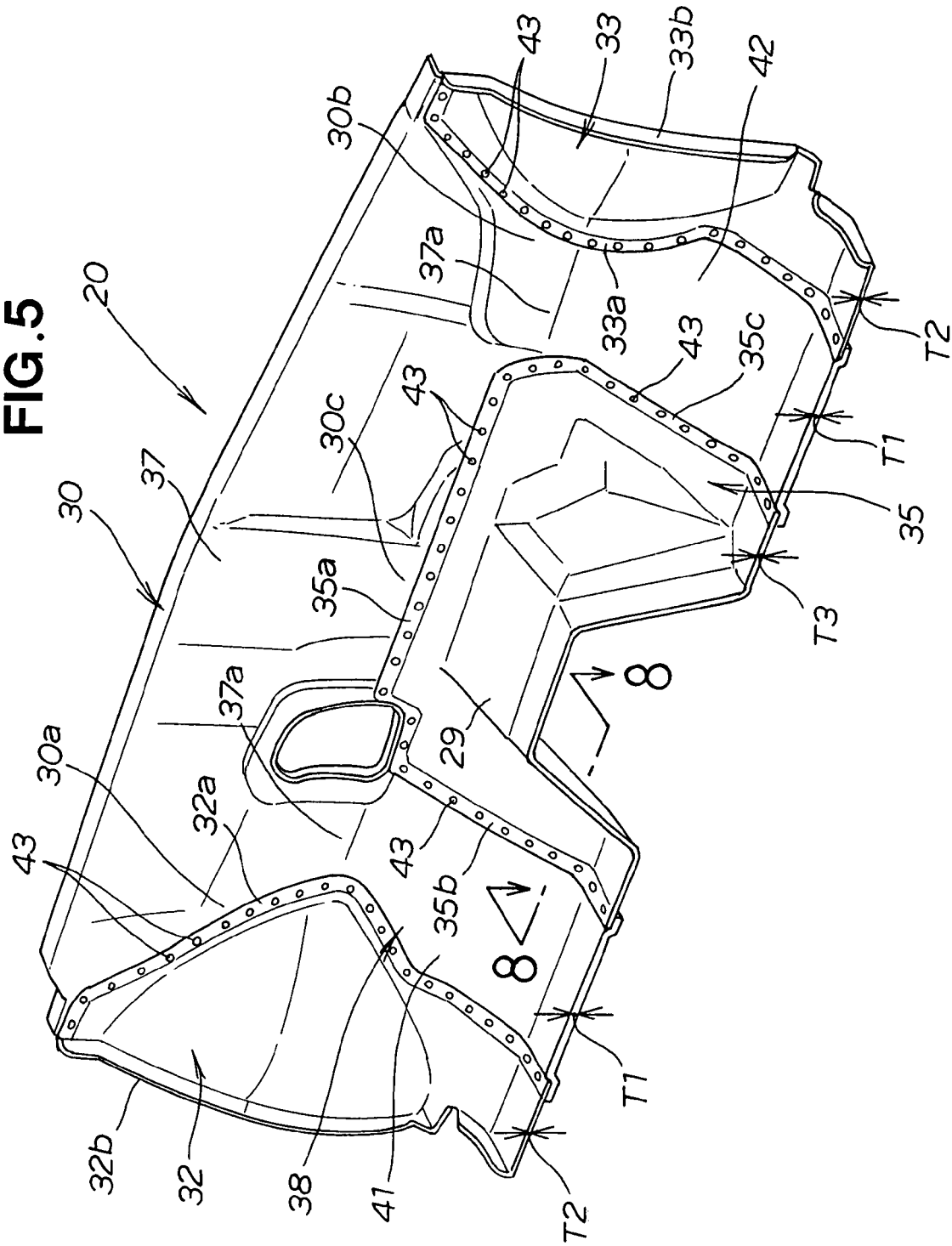
FIG. 5 is a perspective view of the firewall shown in FIG. 4.
Figure 6:
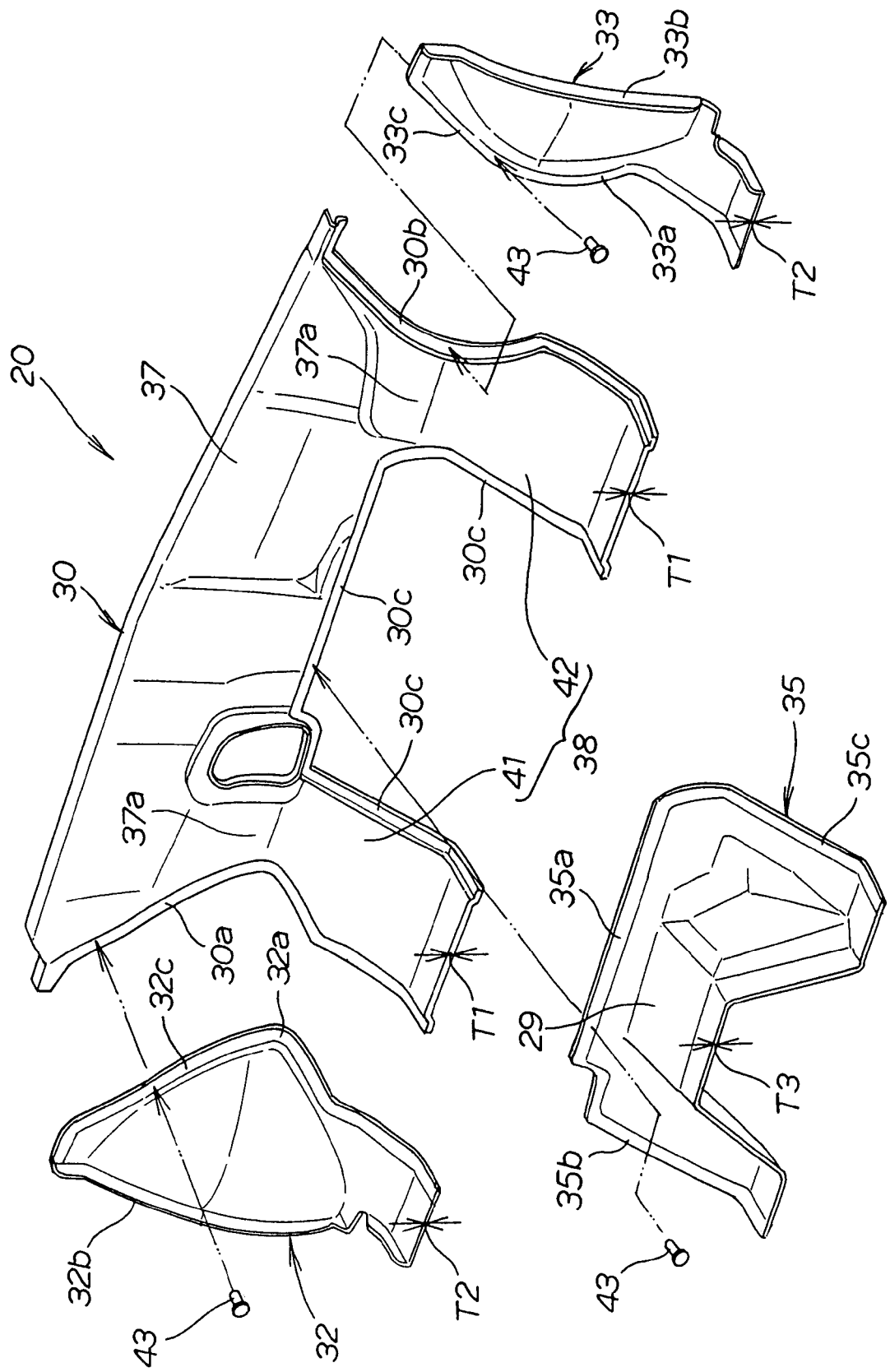
FIG. 6 is an exploded perspective view of the firewall shown in FIG. 5.

The firewall 20 comprises a light alloy aluminum alloy board body 30; a steel left housing curved part 32 that is provided to a left end part 30a of the board body 30; a steel right housing curved part 33 that is provided to a right end part 30b of the board body 30; and a steel tunnel part 35 that is provided to a lower center part 30c of the board body 30, as shown in FIGS. 5 and 6.

The board body 30 is a panel formed from an aluminum alloy. For example, the specific gravity of aluminum alloy (Japanese Industrial Standards A5052) is 2.7, whereas the specific gravity of steel (Japanese Industrial Standards S55C) is 7.9. Specifically, the specific gravity of aluminum alloy is about ⅓ that of steel. Consequently, the weight of the vehicle body can be reduced by using an aluminum alloy board body 30.

The board body 30 is formed by an upper half 37 extending vertically upwards, and a lower half part 38 that is provided sloping downwards from the lower end part 37a of the upper half 37 toward the back of the vehicle body. The lower half part 38 has a passenger-side foot rest 41 on the left side and a driver-side foot rest 42 on the right side. As shown in FIG. 3, the passenger-side foot rest 41 is an area for supporting the feet 63 of a vehicle occupant sitting in a passenger seat 62, and the driver-side foot rest 42 is an area for supporting the feet 66 of a vehicle occupant sitting in a driver seat 65.

The left and right end parts 30a, 30b of the board body 30 are formed so as to be hollowed inward towards the center of the vehicle in the width direction. The lower center part 30c of the board body 30 is formed having a concave shape between the passenger-side foot rest 41 and the driver-side foot rest 42.

Since the specific gravity of aluminum alloy is about ⅓ that of the specific gravity of steel, the plate thickness T1 of the aluminum alloy board body 30 may be increased to about three times that of a steel board. It is therefore possible to ensure the thicknesses of the plate thicknesses T1 of only the passenger-side foot rest 41 and the driver-side foot rest 42.

Increasing the plate thicknesses T1 of the passenger-side foot rest 41 and the driver-side foot rest 42 makes it possible to increase the rigidity of the passenger-side foot rest 41 and the driver-side foot rest 42. Increasing the plate thicknesses T1 in particular makes it possible to increase the rigidity when a load is applied in a direction perpendicular to the passenger-side foot rest 41 and the driver-side foot rest 42 (hereinafter referred to as "rigidity in the out-of-plane direction").

Figure 7:
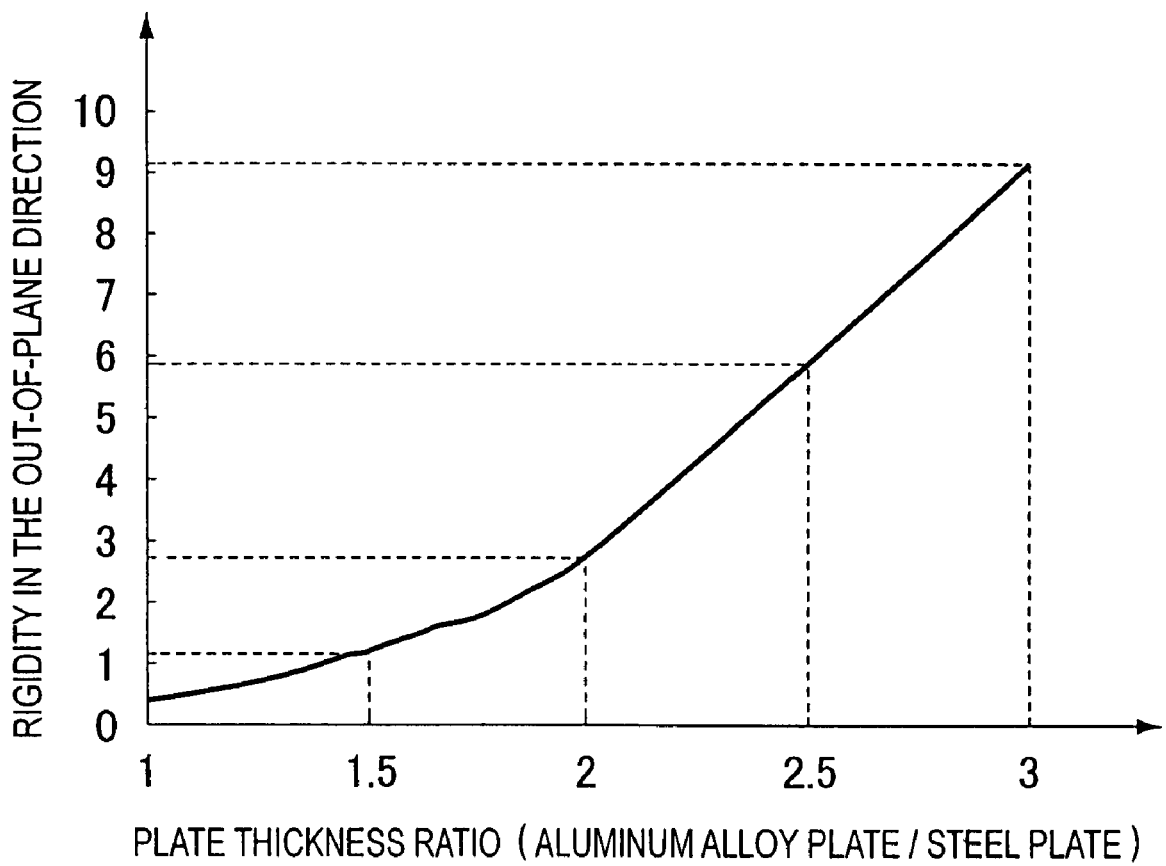
FIG. 7 is a graph showing a ratio of rigidity in the out-of-plane direction relative to a plate thickness ratio of an aluminum alloy plate and a steel plate.

FIG. 7 shows a graph for describing the rigidity in the out-of-plane direction in relation to the plate thickness ratio of an aluminum alloy plate and a steel plate.

When the plate thickness ratio of an aluminum alloy plate and a steel plate is 1.5, the rigidity ratio in the out-of-plane direction is 1.2. When the plate thickness ratio of an aluminum alloy plate and a steel plate is 2, the rigidity ratio in the out-of-plane direction is 2.7. When the plate thickness ratio of an aluminum alloy plate and a steel plate is 2.5, the rigidity ratio in the out-of-plane direction is 5.8. When the plate thickness ratio of an aluminum alloy plate and a steel plate is 3, the rigidity ratio in the out-of-plane direction is 9.2.

Forming the board body 30 from an aluminum alloy therefore makes it possible to reduce the weight of the vehicle, increase the plate thicknesses T1 of the passenger-side foot rest 41 and driver-side foot rest 42, and increase the rigidity in the out-of-plane direction of the respective members.

The reason for increasing the plate thicknesses T1 of the passenger-side foot rest 41 and the driver-side foot rest 42 win now be described in detail using FIGS. 11A and 11B.

As shown in FIGS. 5 and 6, the left and right housing curved parts 32, 33 are members formed from steel. Having the left and right housing curved parts 32, 33 formed from steel enables the plate thicknesses T2 of the left and right housing curved parts 32, 33 to be reduced. Consequently, there is an increased degree of freedom in regard to the configuration of the left and right housing curved parts 32, 33 obtained by press molding. It is thereby possible to satisfactorily press mold the firewall 20, which can by manufactured with even greater accuracy.

The left and right housing curved parts will be described next.

The left housing curved part 32 is a member formed from steel, and the inner part 32a is formed in a convex shape that protrudes toward the center of the vehicle. The outer part 32b is formed flat. The convex inner part 32a overlaps on the left end part 30a of the board body 30. The inner part 32a overlapping the left end part 30a of the board body 30 is joined to the left end part 30a using a plurality of self-piercing rivets (fastening members) 43, and the left housing curved member is joined to the left end part 30a of the board body 30.

The self-piercing rivets 43 will be described in detail using FIG. 8.

Having he outer part 32b of the left housing curved member 32 formed flat enables the outer part 32b to be brought into contact with the left pillar 26 (see FIG. 4). The outer part 32b which has been brought into contact with the left pillar 26 is spot welded to the left pillar 26.

Using a steel member for the left housing curved part 32 enables an increased degree of freedom to be obtained in regard to forming the left housing curved part 32 using press molding. A rear part 46a of the left wheel housing 46 (see FIG. 1) can therefore be fabricated using the left housing curved part 32, which is readily press-molded.

Specifically, the left housing curved part 32 is attached to the left end part 30a of the board body 30, in which state the left housing curved part 32 juts outward in a curved shape from the left end part 30a toward the back of the vehicle body.

Having the left housing curved part 32 jut outward toward the rear of the vehicle body enables the upper half 37 of the board body 30 to be positioned at a front end part 32c of the left housing curved part 32. The front end part 32c of the left housing curved part 32 is an area corresponding to the upper half portion of the inner part 32a.

Having the left housing curved part 32 formed in a curved shape enables a front surface 32d (see FIG. 2) of the left housing curved part 32 to be formed in a concave shape. Having the front surface 32d formed in a concave shape prevents the front surface 32d from interfering with a rear part 45a of a left front wheel 45 (see FIG. 1). Specifically, the left housing curved part 32 forms the rear part 46a of the left wheel housing 46 shown in FIG. 1. The left wheel housing 46 covers a top part 45b of the left front wheel 45.

The exterior shape of the right housing curved part 33 is bilaterally symmetrical to the left housing curved part 32.

Specifically, the right housing curved part 33 is formed using steel, the inner part 33a is formed having a convex shape protruding toward the center of the vehicle, and the outer part 33b is formed flat. Since the inner part 33a is formed having convex shape, the inner part 33a overlaps the right end part 30b of the board body 30. The inner part 33a overlapping the right rear end part 30b of the board body 30 is joined to the right end part 30b using a plurality of self-piercing rivets 43. The right housing curved part 33 is thereby joined to the right end part 30b of the board body 30.

Having the outer part 33b of the right housing curved member 33 formed so as to be flat enables the outer part 33b to be brought into contact with the right pillar 27 (see FIG. 4). The outer part 33b, which has been brought into contact with the left pillar 27, is spot welded to the left pillar 27.

Using a steel member for the right housing curved part 33 enables the right housing curved part 33 to be readily fabricated by press molding. A rear part 48a of the right wheel housing 48 (see FIG. 1) can therefore be readily fabricated by press molding the right housing curved part 33. Specifically, the right housing curved part 33 is attached to the right end part 30b of the board body 30, in which state the right housing curved part 33 juts outward in a curved shape from the right end part 30b toward the rear of the vehicle body.

Having the right housing curved part 33 jut outward toward the back of the vehicle body enables the upper half 37 of the board body 30 to be positioned at a front end part 33c of the right housing curved part 33. The front end part 33c of the right housing curved part 33 is an area corresponding to the upper half portion of the inner part 33a.

Having the right housing curved part 33 formed in a curved shape enables a front surface 33d (see FIG. 2) of the right housing curved part 33 to be formed in a concave shape. Having the front surface 33d formed in a concave shape prevents the front surface 33d from interfering with a rear part 47a of a right front wheel 45 (see FIG. 1). Specifically, the right housing curved part 33 forms the rear part 48a of the right wheel housing 48 shown in FIG. 1. The right wheel housing 48 covers a top part 47b of the right front wheel 47 (see FIG. 1).

As described above, the left housing curved part 32 forms the rear part 46a of the left wheel housing 46 (see FIG. 1) and the right housing curved part 33 forms the rear part 48a of the right wheel house 48 (see FIG. 1). The board body 30 is thereby disposed between the left and right wheel housings 46, 48. Therefore, the board body 30 is positioned in front of the rear edge of the left and right wheel housings 46, 48 (i.e., the rear edge of the left and right housing curved parts 32, 33), as shown in FIG. 1, and the size of the cabin 15 can be kept large.

The left and right housing curved parts 32, 33 are attached to the board body 30 by a plurality of self-piercing rivets 43 in a pre-step for attaching the firewall 20 to the vehicle body (i.e., in a sub-line).

Thus, when the left and right housing curved parts 32, 33 are attached to the board body 30 alone, the rivet fastening locations can be readily aligned with the fastening members of a rivet fastening device (not shown). In other words, the rivet fastening device is used to readily and securely join the left and right housing curved parts 32, 33 to the board body 30 using a plurality of self-piercing rivets 43.

Since the tunnel part 35 is formed using steel, the thickness T3 thereof can be reduced, and a greater degree of freedom can be obtained in regard to the shape formed by press molding. Therefore, the firewall 20 can be readily molded, and manufactured to a greater degree of precision.

The tunnel part 35 is formed so the outline thereof is a substantially rectangular shape, and a tunnel front end part (front end part) 29 to which the floor tunnel 28 is connected is formed in the center of the tunnel part 35. A front edge 35a, a left edge 35b, and a right edge 35c of the tunnel part 35 overlap the concave lower center part 30c of the board body 30, and are joined to the lower center part 30c by a plurality of self-piercing rivets 43. The tunnel part 35 is thereby attached to the board body 30.

The tunnel part 35 is attached to the lower center part 30c of the board body 30, in which state the tunnel front end part 29 is formed so as to protrude toward the cabin 15 and faces in the longitudinal direction of the vehicle body. The tunnel part 35 is attached to the board body 30 in a sub-line.

Thus, when the tunnel part 35 the board body 30 alone, rivet fastening locations can be easily aligned with the fastening members of the rivet fastening device (not shown)

FIG. 8 shows a self-piercing rivet 43.

The self-piercing rivet has a head part 51 and a cylindrical shaft part 52 extending from the head part 51.

When the self-piercing rivet 43 is driven into the left edge 35b of the steel tunnel part 35, the shaft part 52 of the rivet 43 penetrates the left edge 35b. Having thus penetrated the left edge, the shaft part 52 enters the board body 30. The tip end part 52a of the shaft part 52 expands outward in the radial direction inside the board body 30, and the left edge 35b of the tunnel part 35 and the lower center part 30c of the aluminum alloy board body 30 are firmly joined together by the self-piercing rivet 43.

The aluminum alloy board body 30 and the steel left and right housing curved parts 32, 33 are similarly joined together using the self-piercing rivet 43.

The rear end part 12a of the left front side member 12 is attached to the board body 30, as shown in FIGS. 2 and 3. The front end part 16a of the left side rail 16 is attached to the left housing curved part 32.

The rear end part 13a of the right front side member 13 is similarly attached to the board body 30. The front end part 17a of the right side rail 17 is attached to the right housing curved part 33.

FIG. 9 shows a cross-section of the floor panel 22.

The front end part 22a of the floor panel 22 has a center area 55 in which the floor tunnel 28 is formed; a passenger-side area 56 on the left side of the center area 55; a left sill-side area 57 on the left side of the passenger-side area 56; a driver-side area 58 (see FIG. 4) on the right side of the center area 55; and a right sill-side area 59 (see FIG. 4) on the right side of the driver-side area 58.

The rivet fastening device (not shown) is disposed away from the assembly line. Therefore, the rivet fastening device is separated from the center area 55, and does not readily reach the center area 55. In addition, the center area 55 is not readily attached to the tunnel part 35 using the rivet fastening device.

In the present invention, the tunnel part 35 is formed from steel, like the floor panel 22. The center area 55 of the floor panel 22 overlaps the rear edge part 35d of the tunnel part 35 and is spot welded thereto. Therefore, the center area 55 can be readily and securely attached to the tunnel part 35.

The passenger-side area 56 and the driver-side area 58 (the driver-side area 58 is depicted in FIG. 4) are positioned in the vicinity of the left and right side parts of the vehicle body, and the fastening members of the rivet fastening device can therefore readily reach the passenger-side area 56 and the driver-side area 58. Consequently, the passenger-side area 56 overlaps a rear edge part 41a of the passenger-side foot rest 41, and is attached using a plurality of self-piercing rivets 43.

Similarly, the driver-side area 58 shown in FIG. 4 overlaps a rear edge part 42a of the driver-side foot rest 42, and is attached by a plurality of self-piercing rivets 43.

The left sill-side area 57 overlaps a rear edge part 32e of the left housing curved part 32, and is readily and securely joined thereto by spot welding.

The right sill-side area 59 shown in FIG. 4 is made to overlap a rear edge part 33e of the right housing curved part 33, and is readily and securely joined thereto by spot welding.

Figure 10A:
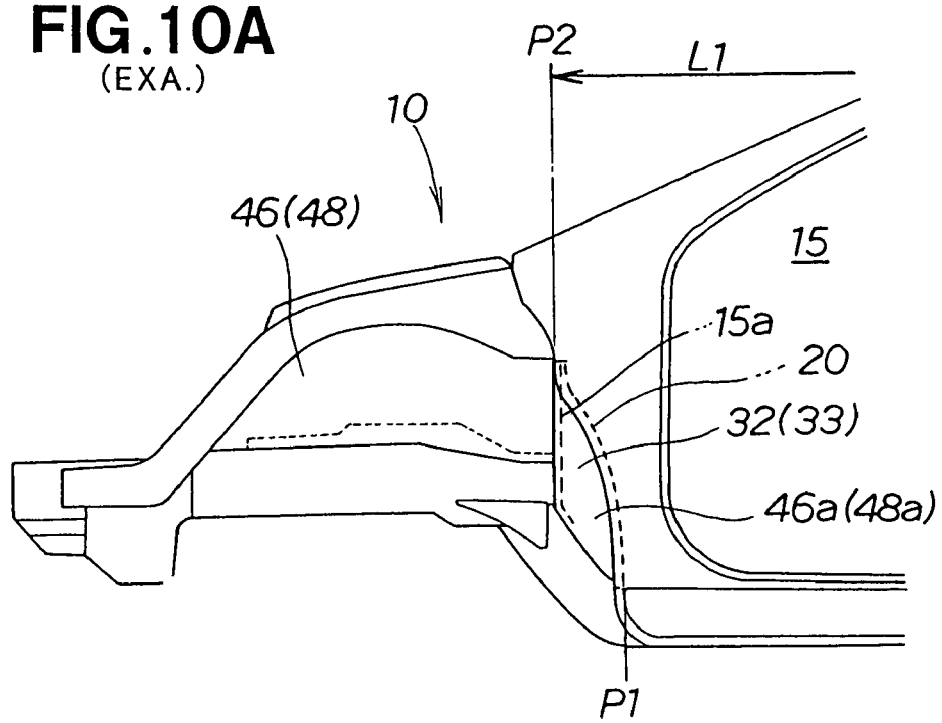
FIGS. 10A and 10B are schematic views showing a difference in cabin size between the vehicle body structure of the present invention and a conventional vehicle body structure.
Figure 10B:
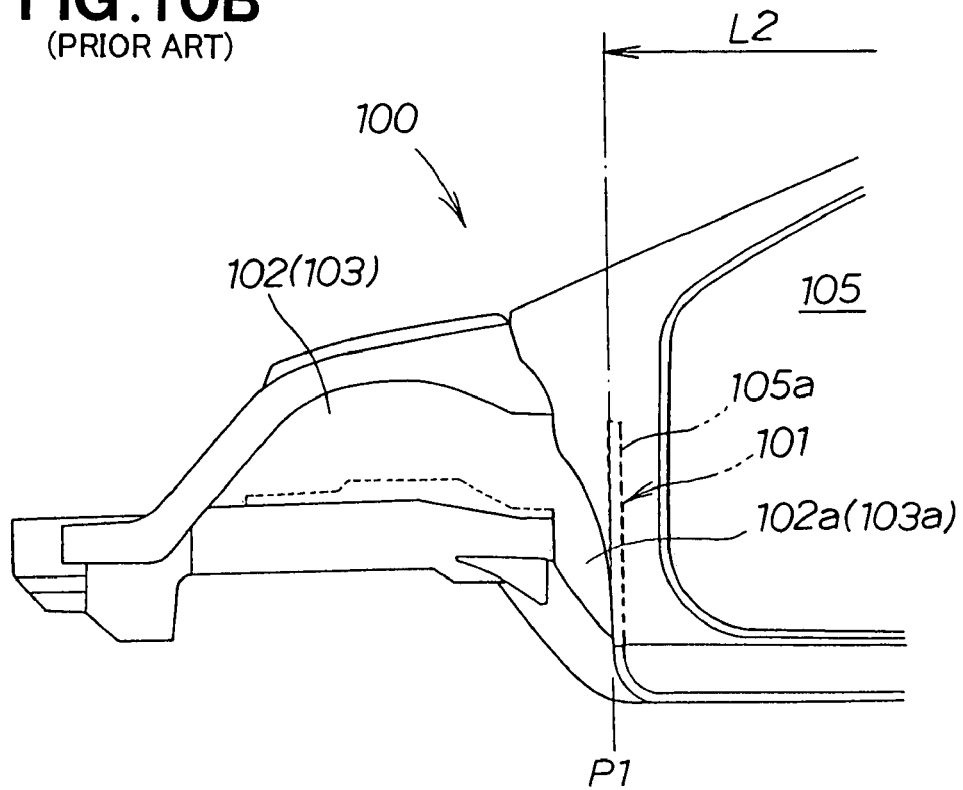

FIGS. 10A and 10B show the size of the cabin in the vehicle body of the present embodiment and in a conventional example.

In the vehicle body structure 10 of the present embodiment shown in FIG. 10A, the left and right housing curved parts 32, 33 of the firewall 20 are formed from steel, and are therefore readily fabricated by press molding. Specifically, the rear parts 46a, 48a of the left and right wheel housings 46, 48 are fabricated by press molding the left and right housing curved parts 32, 33.

Thus, the rear parts 46a, 48a of the left and right wheel housings 46, 48 are configured from the left and right housing curved parts 32, 33 that are attached to the board body 30. The board body 30 can therefore be shifted from the rear edge P1 of the left and right wheel housings 46, 48 to a forward position P2. Therefore, a front edge part 15a of the cabin 15 is disposed toward the front of the vehicle body, and the length L1 of the cabin 15 is increased.

In the conventional vehicle body structure 100 shown in FIG. 10B, the entire firewall 101 is formed from an aluminum alloy. The plate thickness of the firewall 101 must be increased in order to ensure the rigidity of the firewall 101, and the degree of freedom for press molding becomes limited. Therefore, difficulties are encountered in press molding the complex shaped rear parts 102a, 103a of the left and right wheel housings 102, 103.

Consequently, the rear parts 102a, 103a of the left and right wheel housings 102, 103 must be formed using other members. The firewall 101 must also be provided to the rear of the rear edge P1 of the left and right wheel housings 102, 103. Therefore, the front edge 105a of the cabin 105 is less readily positioned toward the front of the vehicle body than in the present embodiment, and the length L2 of the cabin 105 cannot be increased.

A description shall now be provided with reference to FIGS. 11A and 11B in regard to the reason for increasing the plate thickness of the passenger-side foot rest and the driver-side foot rest.

As shown in FIG. 11A, gravel 60 is kicked up toward the firewall 20 by the left wheel 45 and right wheel 47 as indicated by the arrow A, and strikes the passenger-side foot rest 41 and driver-side foot rest 42 shown in FIG. 11B.

Having the board body 30 made of an aluminum alloy enables the passenger-side foot rest 41 and driver-side foot rest 42 to be made thicker than other parts of the board body 30. When gravel that has been kicked up by the wheels strikes the driver-side foot rest and the passenger-side foot rest, the noise and impact force generated by the gravel are minimized by the high rigidity of the driver-side foot rest and the passenger-side foot rest in the out-of-plane direction.

The passenger-side foot rest 41 and the driver-side foot rest 42 also minimize vibration in the board body 30 as caused by vibration from an engine (not shown), while reducing ambient noise caused by the vibration.

In the present embodiment, self-piercing rivets 43 are used as an example of a fastening member; self-piercing rivets are not provided by way of limitation. It is also possible to use ordinary rivets, bolts, or another fastening member.

In the present embodiment, aluminum alloy is used as an example of a light alloy, but a titanium alloy or another light alloy can also be used.

Spot welding was used as an example of welding in the present embodiment, but other types of welding can also be used.

Obviously, various minor changes and modifications of the present invention are possible in light of the above teaching. It is therefore to be understood that within the scope of the appended claims the invention may be practiced otherwise than as specifically described.

What is claimed is:

1. A vehicle body structure comprising:
   a firewall for dividing an engine compartment and a cabin of a vehicle body; and
   a floor panel provided to a lower end portion of the firewall, wherein the firewall comprises:
   a lightweight alloy board body for dividing the engine compartment and the cabin; and
   steel left and right wheel housing curved parts provided to left and right end parts of the board body and forming rear parts of left and right wheel housings, wherein the left and right wheel housing curved parts each have an inner part formed in a convex shape protruding toward a transversely central portion of the vehicle body and connected to a respective one of the left and right end parts of the board body, an outer part formed flat and connected to a respective one of left and right pillars, and a body part extending between the inner part and the outer part of the respective wheel housing curved part and jutting outward in a curved shape from the respective one of the left and right end parts of the board body toward a rear of the vehicle body.

2. The vehicle body structure of claim 1, wherein the floor panel has a floor tunnel formed transversely centrally of the vehicle body and extending longitudinally of the vehicle body, and the firewall further comprises a steel tunnel part provided to a lower central portion of the board body and connected to a front end part of the floor tunnel.

3. A vehicle body structure comprising:
   a firewall for dividing an engine compartment and a cabin of a vehicle body; and
   a floor panel provided to a lower end portion of the firewall, wherein the firewall comprises:
   a lightweight alloy board body for dividing the engine compartment and the cabin; and
   steel left and right wheel housing curved parts provided to left and right end parts of the board body and forming rear parts of left and right wheel housings,
   wherein the board body includes: a passenger-side foot rest for supporting feet of a vehicle occupant sitting in a passenger seat, and a driver-side foot rest for supporting feet of a vehicle occupant sitting in a driver seat.

4. The vehicle body of claim 3, wherein the foot rests are formed so as to be thicker than other parts of the board body.

5. The vehicle body of claim 2, wherein the tunnel part is attached to the board body by a fastening member and is joined to the floor panel by welding.

6. The vehicle body of claim 1, wherein the left and right housing curved parts are attached to the board body by a fastening member and weld-connected to the floor panel.

7. The vehicle body structure of claim 1, wherein the lightweight alloy is an aluminum alloy.

* * * * *